(12) United States Patent
Zhang et al.

(10) Patent No.: US 12,273,771 B2
(45) Date of Patent: Apr. 8, 2025

(54) RADIO ACCESS NETWORK TRAFFIC AWARENESS TRANSMISSION TECHNIQUES

(71) Applicant: ZTE Corporation, Guangdong (CN)

(72) Inventors: Man Zhang, Shenzhen (CN); Yin Gao, Shenzhen (CN); Zhuang Liu, Shenzhen (CN); Dapeng Li, Shenzhen (CN)

(73) Assignee: ZTE Corporation, Shenzhen (CN)

(*) Notice: Subject to any disclaimer, the term of this patent is extended or adjusted under 35 U.S.C. 154(b) by 302 days.

(21) Appl. No.: 18/163,760

(22) Filed: Feb. 2, 2023

(65) Prior Publication Data

US 2023/0189072 A1    Jun. 15, 2023

Related U.S. Application Data

(63) Continuation of application No. PCT/CN2021/106393, filed on Jul. 15, 2021.

(51) Int. Cl.
*H04W 28/08* (2023.01)
*H04W 72/56* (2023.01)

(52) U.S. Cl.
CPC ....... *H04W 28/0967* (2020.05); *H04W 72/56* (2023.01)

(58) Field of Classification Search
None
See application file for complete search history.

(56) References Cited

U.S. PATENT DOCUMENTS

2020/0351963 A1* 11/2020 Shuai .................. H04W 84/12
2021/0211926 A1*  7/2021 Han ..................... H04W 76/27

FOREIGN PATENT DOCUMENTS

| CN | 110972191 A   | 4/2020  |
| CN | 112913280 A   | 6/2021  |
| WO | 2017194768 A1 | 11/2017 |
| WO | 2018145103 A1 | 8/2018  |

OTHER PUBLICATIONS

International Search Report for International Application No. PCT/CN2021/106393, Mail Date: Mar. 23, 2022. 9 pages.

* cited by examiner

*Primary Examiner* — Anh Ngoc M Nguyen
(74) *Attorney, Agent, or Firm* — Perkins Coie LLP

(57) ABSTRACT

Techniques are described to indicate traffic awareness information by a network device. An example wireless communication method includes communicating, by a first network function of a network node, traffic awareness information to a second network function of the network node, wherein the traffic awareness information includes traffic characteristics of one or more quality of service (QoS) flows between the network node and a communication node.

18 Claims, 11 Drawing Sheets

RADIO ACCESS NETWORK TRAFFIC AWARENESS TRANSMISSION TECHNIQUES

CROSS REFERENCE TO RELATED APPLICATIONS

This patent document is a continuation of and claims benefit of priority to International Patent Application No. PCT/CN2021/106393, filed on Jul. 15, 2021. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for indicating traffic awareness information.

An example wireless communication method includes communicating, by a first network function of a network node, traffic awareness information to a second network function of the network node, wherein the traffic awareness information includes traffic characteristics of one or more quality of service (QoS) flows between the network node and a communication node.

In some embodiments, the method further comprises receiving, by the first network function of the network node, a message that indicates that the second network function of the network node received the traffic awareness information. In some embodiments, the traffic awareness information includes any one or more of: a protocol data unit (PDU) session identifier, a slice identifier, a first service information list that includes information about one or more service types, or a second service information list that includes information about the one or more QoS flows. In some embodiments, each item in the first service information list includes any one or more of: a service type, traffic characteristics of the service type, one or more QoS flow identifiers associated with the service type, or a service priority of the service type. In some embodiments, each item in the second service information list includes any one or more of: a QoS flow identifier that identifies a QoS flow, a service type associated with the QoS flow, traffic characteristics associated with the QoS flow, or a service priority associated with the QoS flow.

In some embodiments, the traffic characteristics include traffic pattern information that includes any one or more of the following: a periodicity, a burst size, a data block interval, a data block duration, a maximum packet size, a minimum packet size, a maximum flow bitrate, a minimum flow bitrate, and an average throughput. In some embodiments, the first network function of the network node includes a centralized unit user plane (CU-UP), and wherein the second network function of the network node includes a centralized unit control plane (CU-CP). In some embodiments, the second network function of the network node transmits the traffic awareness information to a third network function of the network node that includes a distributed unit (DU). In some embodiments, the second network function of the network node transmits the traffic awareness information to the DU via a F1AP message. In some embodiments, the second network function of the network node transmits the traffic awareness information to the DU via a user plane data frame. In some embodiments, the second network function of the network node transmits a message to a core network to optimize QoS management, wherein the message comprises any one or more of: the traffic awareness information, at least some of the one or more QoS flows to data radio bearer (DRB) remapping information, or one or more recommended QoS parameters.

In some embodiments, the method further comprises receiving, from the core network, one or more adjusted QoS parameters that are adjusted based on any one or more of the traffic awareness information or the one or more recommended QoS parameters. In some embodiments, the first network function of the network node transmits to a core network a packet data unit (PDU) session user plane data frame that includes the traffic awareness information. In some embodiments, the first network function of the network node receives a traffic awareness transmission configuration from a core network, wherein the traffic awareness transmission configuration includes any one or more of: an indication for the network node to detect traffic characteristics of the one or more QoS flows and service types, a start time when the network node is to begin detecting the traffic characteristics of the one or more QoS flows, a stop time when the network node is to stop detecting the traffic characteristics of the one or more QoS flows, a sampling rate used by the network node to detect the traffic characteristics of the one or more QoS flows, or a service list that indicates one or more services that are indicated to the network node to detect. In some embodiments, the core network includes a 5G core network (5GC).

In some embodiments, the second network function of the network node receives a traffic awareness transmission configuration from an operation, administration and management (OAM) device, wherein the traffic awareness transmission configuration includes any one or more of: an indication for the network node to detect traffic characteristics of the one or more QoS flows and service types, a start time when the network node is to begin detecting the traffic characteristics of the one or more QoS flows, a stop time when the network node is to stop detecting the traffic characteristics of the one or more QoS flows, a sampling rate used by the network node to detect the traffic characteristics of the one or more QoS flows, or a service list that indicates one or more services that are indicated to the network node to detect. In some embodiments, the second network function of the network node sends a traffic awareness transmission configuration to the first network function of the network node to trigger to the network node to detect the traffic characteristics of the one or more QoS flows, wherein the traffic awareness transmission configuration includes any one or more of: an indication for the network node to detect traffic characteristics of the one or more QoS flows and service types, a start time when the network node is to begin detecting the traffic characteristics of the one or more QoS flows, a stop time when the network node is to stop detecting the traffic characteristics of the one or more QoS flows, a sampling rate used by the network node to detect the traffic characteristics of the one or more QoS flows, or a service list that indicates one or more services that are indicated to the network node to detect.

Another example wireless communication method includes receiving, by a network function of a network node, a first message comprising deep packet inspection (DPI) results from a core network, wherein the DPI results include any one or more of: a service type, one or more quality of flow (QoS) requirements associated with the service type, a bandwidth of traffic flow, an encoding protocol, and a frame related information; and transmitting, by the network function of the network node and in response to the receiving the DPI results, a traffic awareness information to a distributed unit (DU) of the network node, wherein the traffic awareness information includes traffic characteristics of one or more quality of service (QoS) flows operated between the network node and a communication node.

In some embodiments, the traffic awareness information comprises any one or more of: a protocol data unit (PDU) session identifier, a slice identifier, or the DPI results. In some embodiments, the network function of the network node sends a second message to the core network to trigger a device in the core network to perform a DPI operation to obtain the DPI results, and the DPI operation is performed before the DPI results are received in the first message. In some embodiments, the network function includes a centralized unit control plane (CU-CP), and the core network includes a 5G core network (5GC).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Flows of different services have different quality of service (QoS) requirements. In 5G QoS model, NG-RAN performs QoS flow to data radio bearer (DRB) mapping based on the QoS flow identifier (QFI) and associated QoS profiles. However, with the emergence of diverse new service types such as augmented reality (AR), extended reality (XR), etc., the current QFI and QoS profiles may not be enough to support the differentiation of flows from different services. Traffic characteristics and service awareness in RAN side could help the NG-RAN node to differentiate flows of different services and help optimize resource scheduling to meet the requirements of different services and to provide better quality of service.

Based on the QoS architecture in NG-RAN, for each UE, 5G core network (5GC) establishes one or more protocol data unit (PDU) Sessions. The NG-RAN establishes at least one DRB together with the PDU Session and additional DRB(s) for QoS flow(s) of that PDU session can be subsequently configured, except for the cased of NB-IoT. The NG-RAN maps packets belonging to different PDU sessions to different DRBs. The QoS flow to DRB mapping by NG-RAN is based on QFI and the associated QoS profiles (e.g., QoS parameters and QoS characteristics).

In NG-RAN, the base station centralized unit control plane (gNB-CU-CP) can decide the mapping and remapping of QoS flows to DRB. The gNB-CU could send the remapping information to a base station's distributed unit (gNB-DU) via F1AP message such as UE Context Modification Request. In some embodiments, the base station that includes the CU-CP may be the same as the base station that includes the DU. The NR user plane protocol is used to convey control information related to the user data flow management of data radio bearers. The PDU session user plane (UP) layer uses services of the Transport Network Layer in order to send its packets over the interface. A function provided by PDU session user plane protocol layer is provision of control information elements (e.g. QFI, RQI) associated with a PDU session. Deep Packet Inspection (DPI) is a technology implemented in Core network, which can be used to detect the information related to traffic flows.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Embodiment 1: RAN Traffic Awareness Transmission with Flow to DRB Remapping

Figure 1:
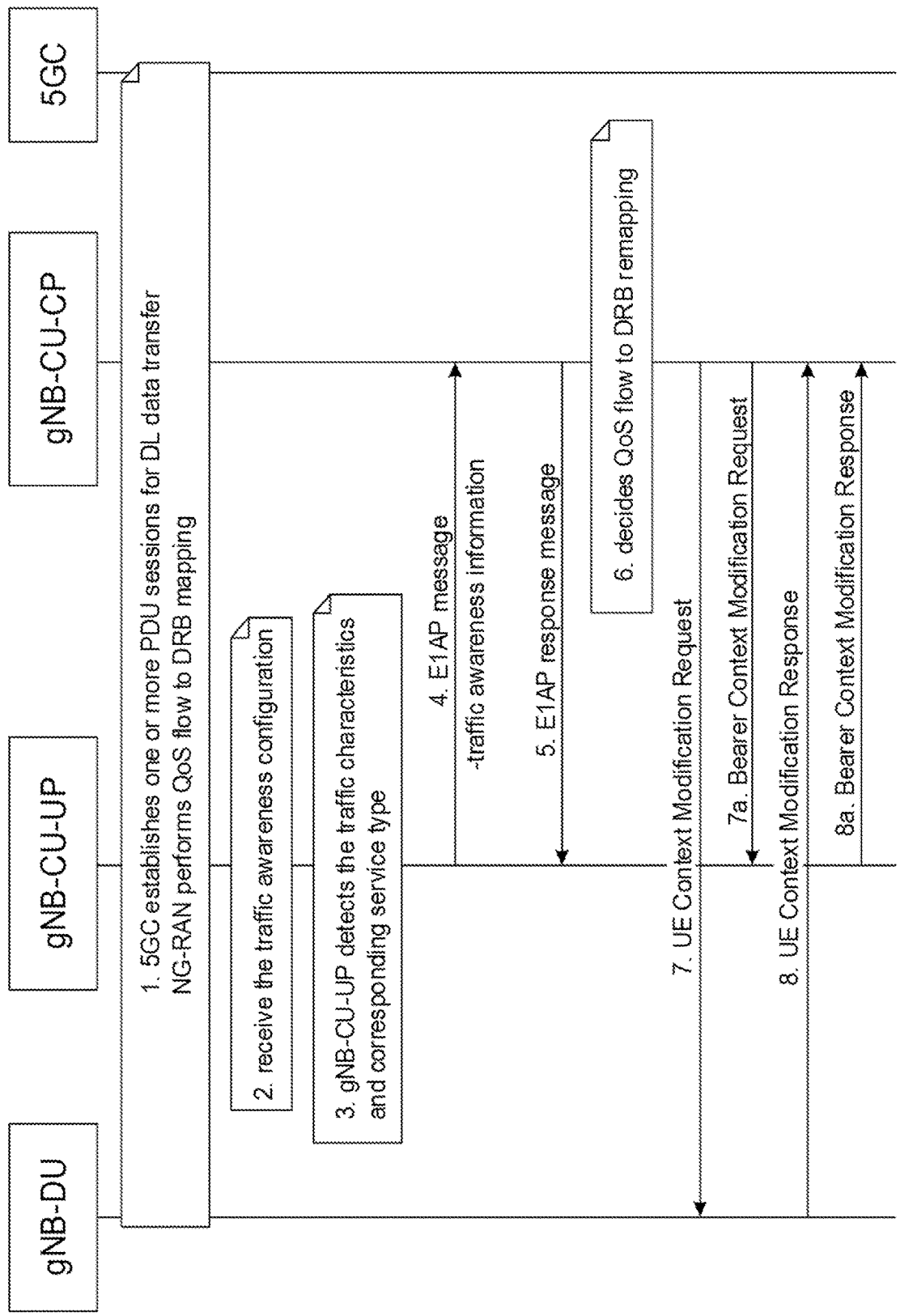
FIG. 1 is an example flowchart for traffic awareness transmission with flow to data radio bearer (DRB) remapping.

FIG. 1 is an example flowchart for traffic awareness transmission with flow to DRB remapping. The step numbers described below relate to the numbers indicated in the flowchart in FIG. 1.

Step 1: 5GC establishes one or more PDU session(s) for DL data transfer. NG-RAN establishes DRB(s) and performs QoS flow to DRB mapping, based on QFI and associated QoS profiles.

Step 2: gNB-CU-CP receives the traffic awareness configuration, which could be generated by 5GC, operation, administration and management (OAM) device or gNB-CU-CP. The configuration includes any one or more of the following items:
- An indication for RAN (e.g., gNB-CU-UP) to detect traffic characteristics of one or more QoS flows and service types
- Start time, which is the time for the gNB-CU-UP to start detecting traffic characteristics of one or more QoS flows
- Stop time, which is the time for the gNB-CU-UP to stop detecting traffic characteristics of one or more QoS flows
- Sampling rate, which is used to detect the traffic characteristics of one or more QoS flows
- Service list, which contains the one or more services that 5GC wants the RAN to detect Detail procedures for configuring RAN traffic awareness is shown at least in Embodiment 5.

Step 3: gNB-CU-UP detects the traffic characteristics of the one or more QoS flows, where the one or more QoS flows are operated between a UE and the network node that includes the CU-UP. The gNB-CU-UP may also determine, based on the traffic characteristics, the service type to which the QoS flow belongs. For example, if the traffic characteristic of the QoS flow has a large throughput with a large packet size, then the gNB-CU-UP can determine that the QoS flow may belong to a streaming service. In some embodiments, the base station that includes the CU-CP may be the same as the base station that includes the CU-UP.

Step 4: gNB-CU-UP sends the traffic awareness information gNB-CU-CP via E1AP message (e.g. Bearer Context Modification Required). The traffic awareness information at least includes any one or more of the following items:
   PDU session ID
   Slice ID
   service information list for one or more service types, where the service information list may include for each item in the list any one or more of the following items:
     service type
     traffic characteristics associated with the service type
     one or more QoS flow ID(s) of associated with a same service type, and/or
     service priority associated with the service type
   service information list for one or more QoS flows, where the service information list may include for each item in the list any one or more of the following items:
     QoS flow ID of a QoS flow
     service type associated with the QoS flow identified by the QoS flow ID
     traffic characteristics associated with the QoS flow identified by the QoS flow ID, and/or
     service priority associated with the QoS flow identified by the QoS flow ID The traffic characteristics may include traffic pattern information, including but not limited to any one or more of the following: periodicity, burst size, data block interval, data block duration, maximum packet size, minimum packet size, maximum flow bitrate, minimum flow bitrate, average throughput, etc.

Step 5: gNB-CU-CP sends E1AP response message to notify gNB-CU-UP that it has received the traffic awareness information.

Step 6: gNB-CU-CP decides QoS flow(s) to DRB remapping, based on the traffic awareness information received from gNB-CU-UP.

Step 7: gNB-CU-CP sends the QoS flow(s) to DRB remapping information to gNB-DU via UE Context Modification Request message over F1AP.

Step 7a: gNB-CU-CP sends the e QoS flow(s) to DRB remapping information to gNB-CU-UP via E1AP message (e.g. Bearer Context Modification Request).

Step 8: gNB-DU replies to gNB-CU-CP with UE Context Modification Response message, to notify gNB-CU that it has received the remapping information.

Step 8a: gNB-CU-UP notifies gNB-CU-CP that it has received the QoS flow(s) to DRB remapping information via E1AP message (e.g. Bearer Context Modification Response).

Embodiment 2: RAN Traffic Awareness Transmission

Figure 2:
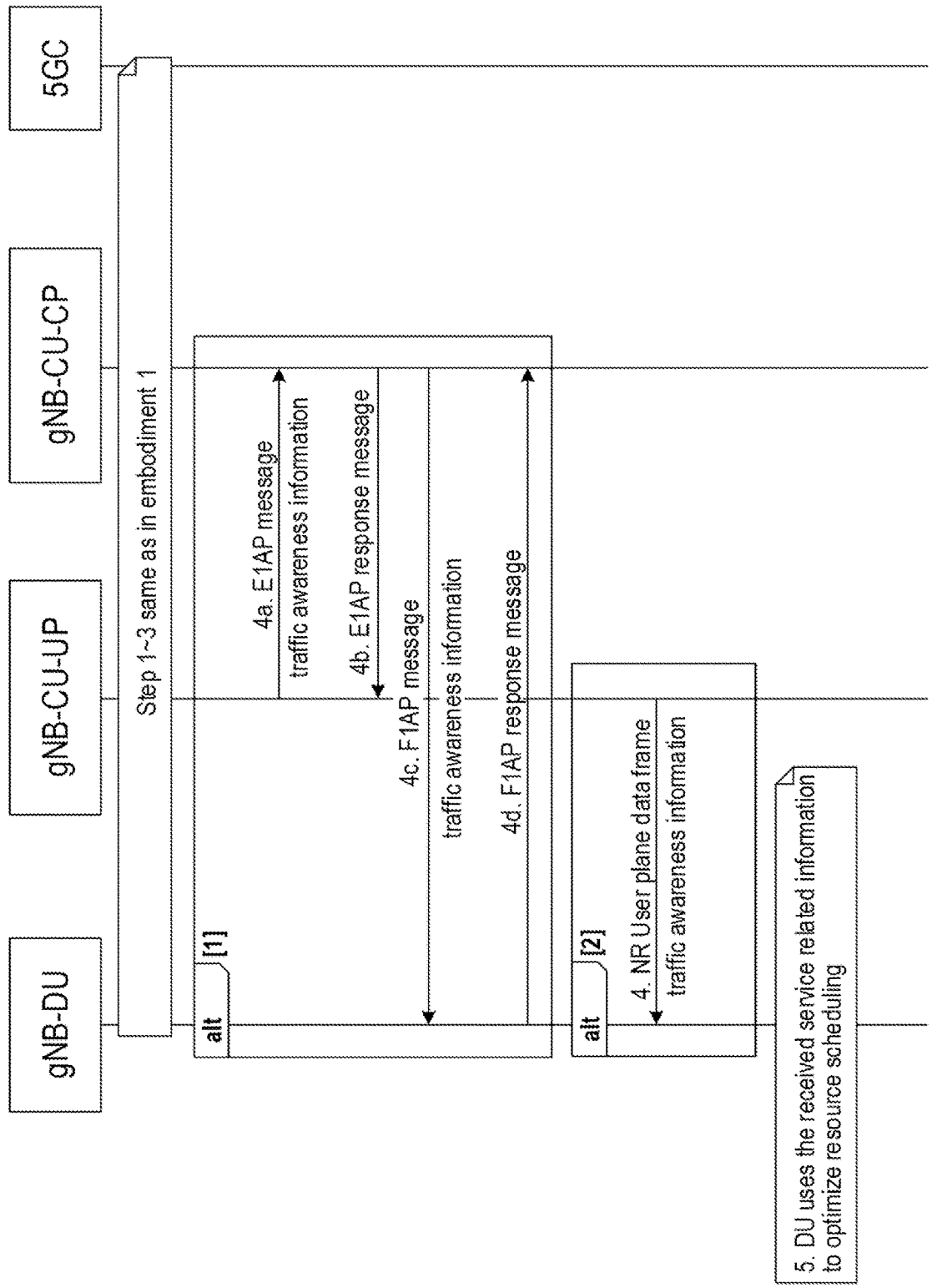
FIG. 2 is an example flowchart for traffic awareness transmission.

FIG. 2 is an example flowchart for traffic awareness transmission. The step numbers described below relate to the numbers indicated in the flowchart in FIG. 2.

Step 1 to 3 can be the same as those in Embodiment 1.

There are two alternatives for gNB-CU-UP to transfer the detected RAN traffic awareness information to gNB-DU, as depicted in FIG. 2 as alt [1] and alt [2]. Alternative 1 is a solution based on network interfaces, and alternative 2 is based on NR-u data frame.

Alternative 1 (indicated as "alt [1]" in FIG. 2):

Step 4a: gNB-CU-UP sends the traffic awareness information gNB-CU-CP via E1AP message (e.g. Bearer Context Modification Required). The traffic awareness information at least includes any one or more of the following items:
   PDU session ID
   Slice ID
   service information list for one or more service types, where the service information list may include for each item in the list any one or more of the following items:
     service type
     traffic characteristics associated with the service type
     one or more QoS flow ID(s) associated with a same service type, and/or
     service priority associated with the service type
   service information list for one or more QoS flows, where the service information list may include for each item in the list any one or more of the following items:
     QoS flow ID of a QoS flow
     service type associated with the QoS flow identified by the QoS flow ID
     traffic characteristics associated with the QoS flow identified by the QoS flow ID, and/or
     service priority associated with the QoS flow identified by the QoS flow ID The traffic characteristics may include traffic pattern information, including but not limited to any one or more of the following: periodicity, burst size, data block interval, data block duration, maximum packet size, minimum packet size, maximum flow bitrate, minimum flow bitrate, average throughput, etc.

Step 4b: gNB-CU-CP sends E1AP response message to notify gNB-CU-UP that it has received the traffic awareness information.

Step 4c: After receiving the traffic awareness information, the gNB-CU-CP transfers it to the gNB-DU via F1AP message (e.g. UE Context Modification Request). The traffic awareness information at least includes any one or more of the following items:
- PDU session ID
- Slice ID
- service information list for one or more service types, where the service information list may include for each item in the list any one or more of the following items:
  - service type
  - traffic characteristics associated with the service type
  - one or more QoS flow ID(s) associated with a same service type, and/or
  - service priority associated with the service type
- service information list for one or more QoS flows, where the service information list may include for each item in the list any one or more of the following items:
  - QoS flow ID of a QoS flow
  - service type associated with the QoS flow identified by the QoS flow ID
  - traffic characteristics associated with the QoS flow identified by the QoS flow ID, and/or
  - service priority associated with the QoS flow identified by the QoS flow ID The traffic characteristics may include traffic pattern information, including but not limited to any one or more of the following: periodicity, burst size, data block interval, data block duration, maximum packet size, minimum packet size, maximum flow bitrate, minimum flow bitrate, average throughput, etc.

Step 4d: gNB-DU sends the gNB-CU-CP F1AP response message (e.g. UE Context Modification Response) to notify gNB-CU that it has received the traffic awareness information.

Alternative 2 (indicated as "alt [2]" in FIG. 2):

Step 4: gNB-CU-UP sends the traffic awareness information to gNB-DU via an already-defined frame or a new-defined NR user plane data frame. The traffic awareness information at least includes any one or more of the following items:
- PDU session ID
- Slice ID
- service information list for one or more service types, where the service information list may include for each item in the list any one or more of the following items:
  - service type
  - traffic characteristics associated with the service type
  - one or more QoS flow ID(s) associated with a same service type, and/or
  - service priority associated with the service type
- service information list for one or more QoS flows, where the service information list may include for each item in the list any one or more of the following items:
  - QoS flow ID of a QoS flow
  - service type associated with the QoS flow identified by the QoS flow ID
  - traffic characteristics associated with the QoS flow identified by the QoS flow ID, and/or
  - service priority associated with the QoS flow identified by the QoS flow ID The traffic characteristics may include traffic pattern information, including but not limited to any one or more of the following: periodicity, burst size, data block interval, data block duration, maximum packet size, minimum packet size, maximum flow bitrate, minimum flow bitrate, average throughput, etc.

Step 5: gNB-DU uses the traffic awareness information received from gNB-CU-CP to optimize resource scheduling. For example, with the detected service type and priority information, gNB-DU can first schedule resources for those services with relative higher priority. Based on the maximum/minimum flow bitrate, maximum/minimum packet size and average flow bitrate, etc., gNB-DU can increase or reduce the resources/bandwidth allocated to corresponding service users. Besides, with the detected service type, gNB-DU can use the common QoS parameters of the corresponding service to adjust scheduling strategies.

Embodiment 3: RAN Traffic Awareness Transmission Interacted with 5GC

Figure 3:
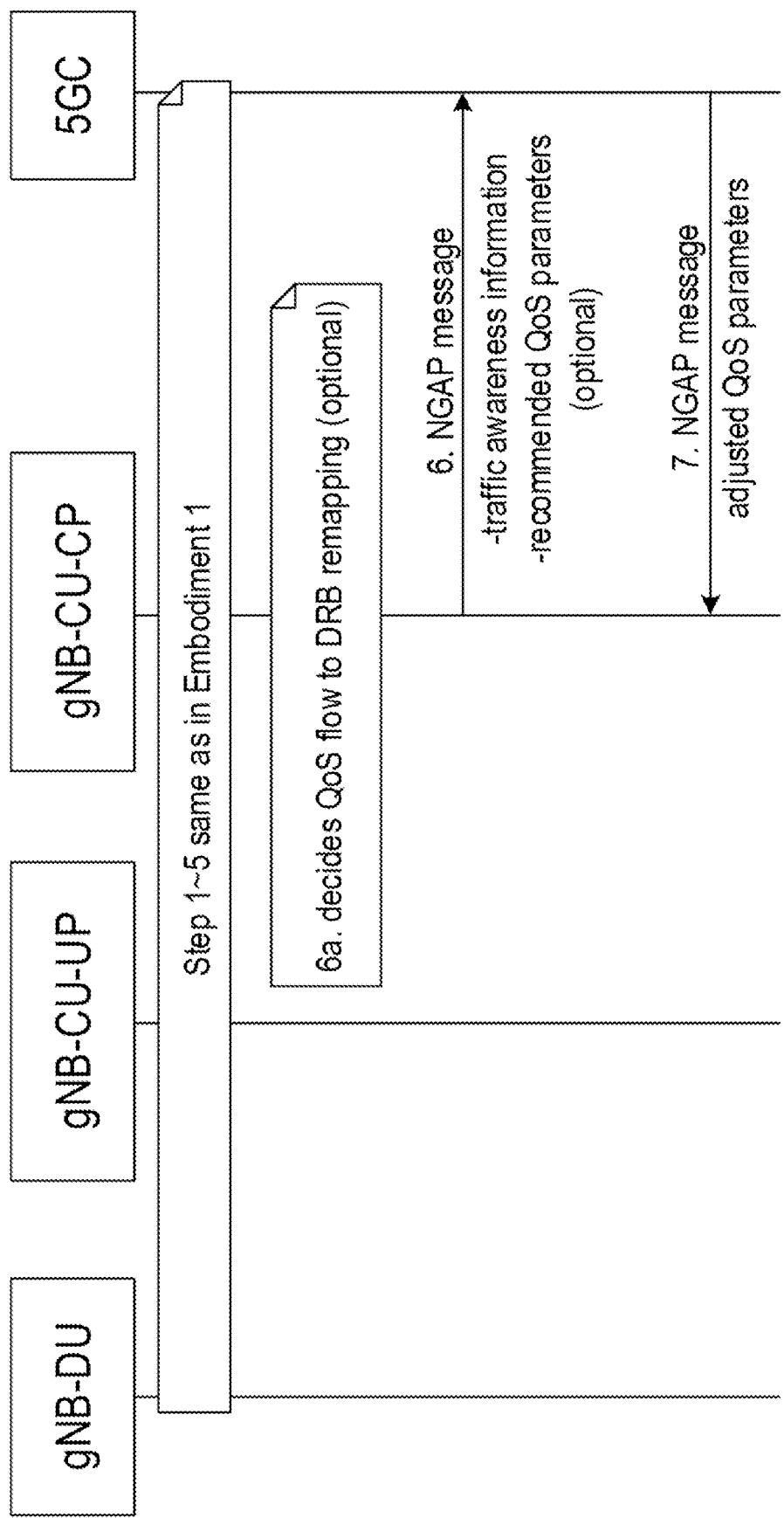
FIG. 3 is an example flowchart for traffic awareness transmission with 5G core network (5GC).

FIG. 3 is an example flowchart for traffic awareness transmission with 5GC. The step numbers described below relate to the numbers indicated in the flowchart in FIG. 3.

Step 1 to 5 can be the same as those in Embodiment 1.

Step 6a: (optional) gNB-CU-CP decides QoS flow to DRB remapping, based on the traffic awareness information received from gNB-CU-UP.

Step 6b. (optional) gNB-CU-CP determines the one or more recommended QoS parameters based on the traffic awareness information.

Step 6: gNB-CU-CP sends NGAP message to 5GC, which includes any one or more of the following information:
- traffic awareness information
- flow(s) to DRB remapping information (optional) (e.g., the flow(s) may include at least some QoS flow(s) that were mapped to DRB in Step 1 of Embodiment 1), and/or
- one or more recommended QoS parameters where the traffic awareness information includes any one or more of the following items:
- PDU session ID
- Slice ID
- service information list for one or more service types, where the service information list may include for each item in the list any one or more of the following items:
  - service type
  - traffic characteristics associated with the service type
  - one or more QoS flow ID(s) associated with a same service type, and/or
  - service priority associated with the service type
- service information list for one or more QoS flows, where the service information list may include for each item in the list any one or more of the following items:
  - QoS flow ID of a QoS flow
  - service type associated with the QoS flow identified by the QoS flow ID
  - traffic characteristics associated with the QoS flow identified by the QoS flow ID, and/or
  - service priority associated with the QoS flow identified by the QoS flow ID The traffic characteristics may include traffic pattern information, including but not limited to any one or more of the following: periodicity, burst size, data block interval, data block duration, maximum packet size, maximum flow bitrate, average throughput, etc.

Step 7: 5GC receives the information from gNB to optimize the QoS management. 5GC can adjust the QoS parameters based on the information received (e.g. any one or more of: the one or more recommended QoS parameters by gNB, or the traffic awareness information detected by gNB). Then 5GC sends the adjusted QoS parameters to gNB-CU-CP via NGAP message (e.g., PDU SESSION MODIFICATION/UE CONTEXT MODIFICATION).

Embodiment 4: RAN Traffic Awareness Transmission Interaction with 5GC

Figure 4:
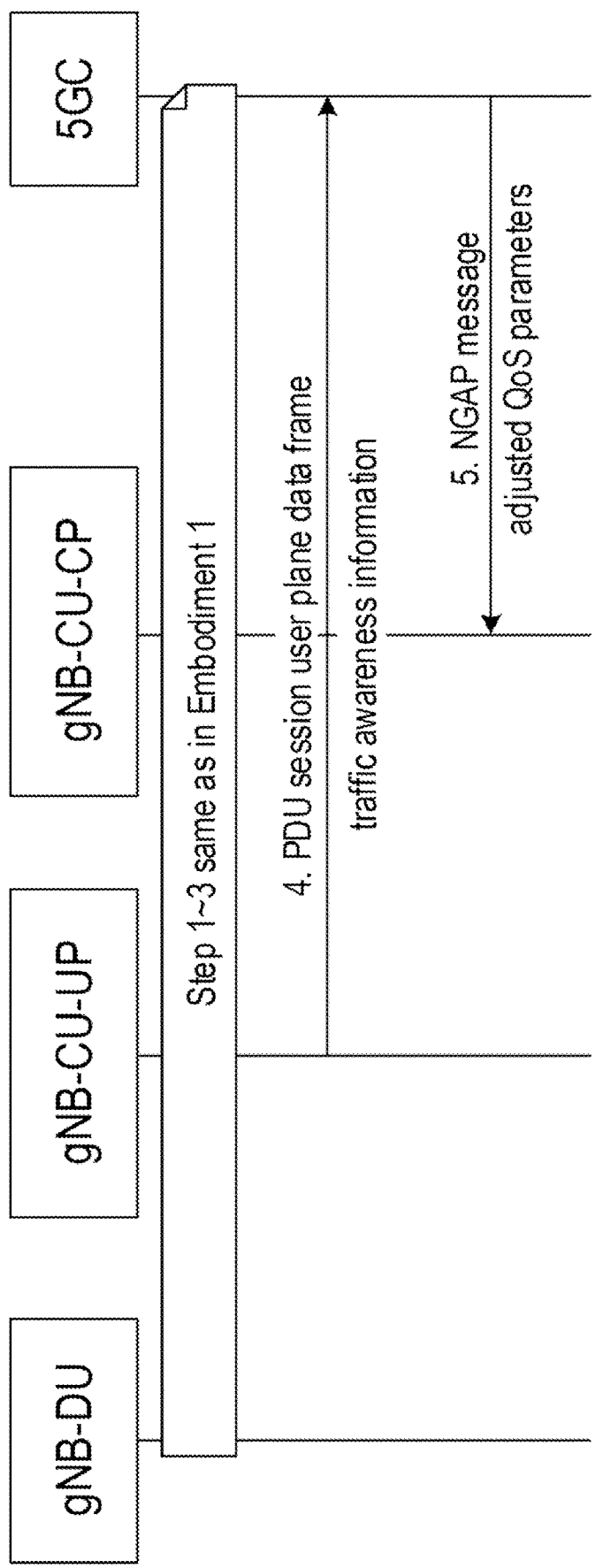
FIG. 4 is an example flowchart for traffic awareness transmission interaction with 5GC.

FIG. 4 is an example flowchart for traffic awareness transmission interaction with 5GC. The step numbers described below relate to the numbers indicated in the flowchart in FIG. 4.

Step 1 to 3 can be the same as those in Embodiment 1.

Step 4: gNB-CU-UP sends the traffic awareness information to 5GC via an already-defined or new-defined PDU session user plane data frame. The traffic awareness information includes any one or more of the following items:
PDU session ID
Slice ID
service information list for one or more service types, where the service information list may include for each item in the list any one or more of the following items:
service type
traffic characteristics associated with the service type
one or more QoS flow ID(s) associated with a same service type, and/or
service priority associated with the service type
service information list for one or more QoS flows, where the service information list may include for each item in the list any one or more of the following items:
QoS flow ID of a QoS flow
service type associated with the QoS flow identified by the QoS flow ID
traffic characteristics associated with the QoS flow identified by the QoS flow ID, and/or
service priority associated with the QoS flow identified by the QoS flow ID The traffic characteristics may include traffic pattern information, including but not limited to any one or more of the following: periodicity, burst size, data block interval, data block duration, maximum packet size, maximum flow bitrate, average throughput, etc.

Step 5: 5GC receives the information from gNB to optimize the QoS management. 5GC can adjust the QoS parameters based on the information received (e.g. any one or more of the one or more recommended QoS parameters by gNB, or the traffic awareness information detected by gNB). Then 5GC sends the adjusted QoS parameters to gNB-CU-CP via NGAP message (e.g., PDU SESSION MODIFICATION/UE CONTEXT MODIFICATION).

Embodiment 5: RAN Traffic Awareness Transmission Configuration

Figure 5:
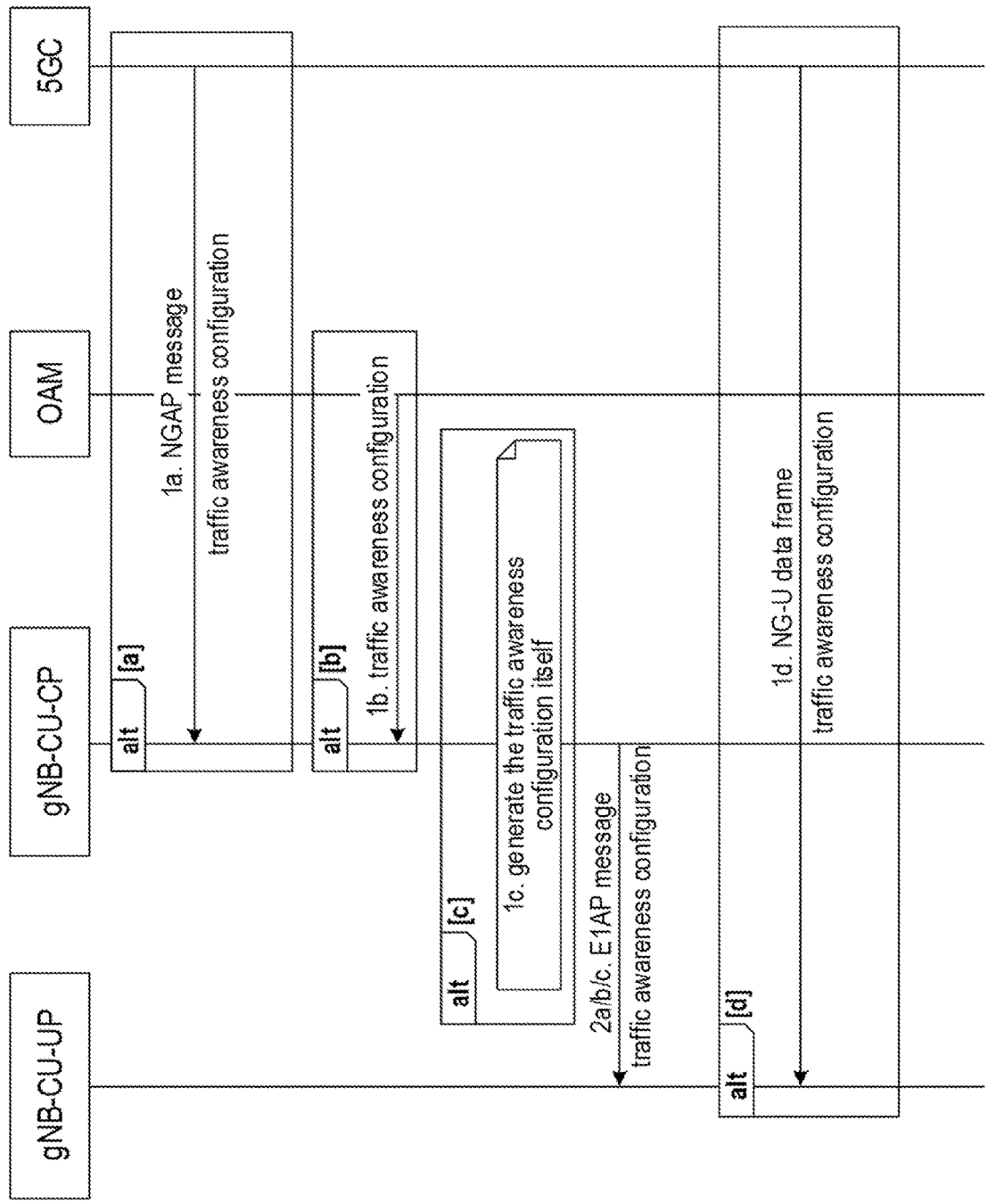
FIG. 5 is an example flowchart for an indication of a RAN traffic awareness transmission configuration.

FIG. 5 is an example flowchart for indication of a RAN traffic awareness transmission configuration. The step numbers described below relate to the numbers indicated in the flowchart in FIG. 5.

There are four alternatives to configure traffic awareness transmission in RAN (as indicated as "alt [a]," "alt [b]," "alt [c]," "alt [d]" in FIG. 5) among which Alternative a ("alt [a]" in FIG. 5) and Alternative d ("alt [b]" in FIG. 5) the case that 5GC configure the Traffic awareness in RAN, Alternative b ("alt [b]" in FIG. 5) is the case that OAM device configures the traffic awareness in RAN, and Alternative c ("alt [c]" in FIG. 5) is the case that gNB-CU-CP configures the traffic awareness itself.

Alternative a

Step 1a: 5GC sends the RAN traffic awareness transmission configuration to gNB-CU-CP via NGAP message, where the configuration includes any one or more of the following items:
an indication for RAN (e.g., gNB-CU-UP) to detect traffic characteristics of one or more QoS flows and service types
start time, which is the time for the gNB-CU-UP to start detecting traffic characteristics of one or more QoS flows
stop time, which is the time for the gNB-CU-UP to stop detecting traffic characteristics of one or more QoS flows
sampling rate, which is used to detect the traffic characteristics of one or more QoS flows
service list, which contains the one or more services that 5GC wants the RAN to detect Alternative b Step 1b: OAM device generates the configuration for RAN traffic awareness transmission and sends it to gNB-CU-CP. The configuration includes any one or more of the following items:
an indication for RAN (e.g., gNB-CU-UP) to detect traffic characteristics of one or more QoS flows and service types
start time, which is the time for the gNB-CU-UP to start detecting traffic characteristics of one or more QoS flows
stop time, which is the time for the gNB-CU-UP to stop detecting traffic characteristics of one or more QoS flows
sampling rate, which is used to detect the traffic characteristics of one or more QoS flows
service list, which contains the one or more services that 5GC wants the RAN to detect Alternative c Step 1c: the gNB-CU-CP itself generates the RAN awareness transmission configuration itself and sends the configuration to gNB-CU-CP in some condition, to request the gNB-CU-UP to start detecting traffic characteristics immediately. The configuration includes any one or more of the following items:
an indication for RAN (e.g., gNB-CU-UP) to detect traffic characteristics of one or more QoS flows and service types
start time, which is the time for the gNB-CU-UP to start detecting traffic characteristics of one or more QoS flows
stop time, which is the time for the gNB-CU-UP to stop detecting traffic characteristics of one or more QoS flows
sampling rate, which is used to detect the traffic characteristics of one or more QoS flows
service list, which contains the one or more services that 5GC wants the RAN to detect Step 2a/b/c: gNB-CU-CP sends the configuration (which could be received from 5GC or OAM device, or be generated by gNB-CU-CP itself) to gNB-CU-UP via E1AP message, where the configuration includes any one or more of the following items:

an indication for RAN (e.g., gNB-CU-UP) to detect traffic characteristics of one or more QoS flows and service types start time, which is the time for the gNB-CU-UP to start detecting traffic characteristics of one or more QoS flows stop time, which is the time for the gNB-CU-UP to stop detecting traffic characteristics of one or more QoS flows sampling rate, which is used to detect the traffic characteristics of one or more QoS flows service list, which contains the one or more services that 5GC wants the RAN to detect Alternative d Step 1d: 5GC sends the RAN traffic awareness transmission configuration to gNB-CU-UP via NG-U data frame, where the configuration includes any one or more of the following items:

an indication for RAN (e.g., gNB-CU-UP) to detect traffic characteristics of one or more QoS flows and service types start time, which is the time for the gNB-CU-UP to start detecting traffic characteristics of one or more QoS flows stop time, which is the time for the gNB-CU-UP to stop detecting traffic characteristics of one or more QoS flows sampling rate, which is used to detect the traffic characteristics of one or more QoS flows service list, which contains the one or more services that 5GC wants the RAN to detect Embodiment 6: RAN Traffic Awareness Transmission with Deep Packet Inspection (DPI)

Figure 6:
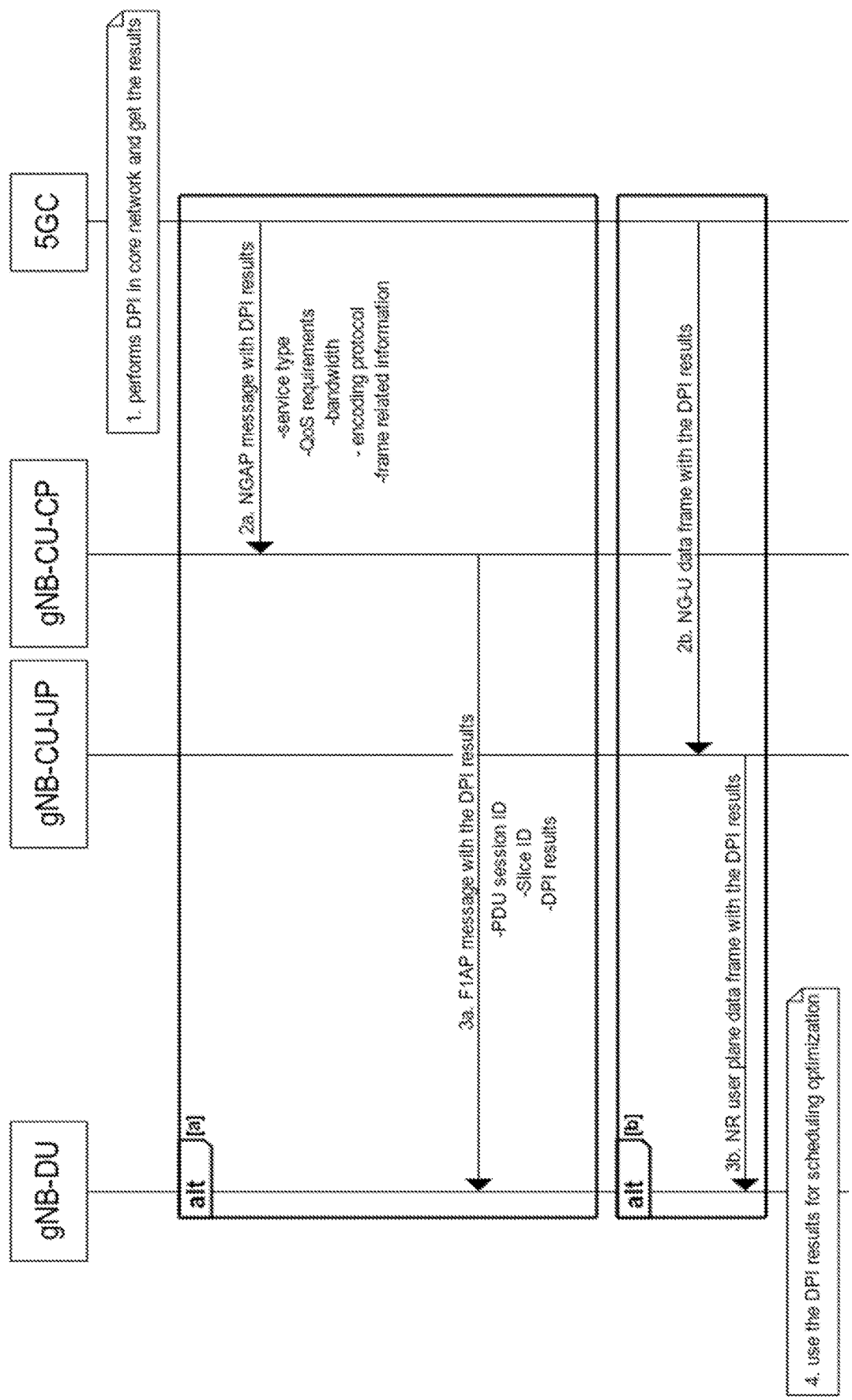
FIG. 6 is an example flowchart for traffic awareness transmission with deep packet inspection (DPI).

FIG. 6 is an example flowchart for traffic awareness transmission with DPI. The step numbers described below relate to the numbers indicated in the flowchart in FIG. 6.

Step 1: 5GC performs DPI based on the configuration and gets the corresponding results, where the results include any one or more of the following items:

service type one or more QoS requirements of the corresponding service type bandwidth of the traffic flow encoding protocol frame related information There are two alternatives for the 5GC to send the DPI results to NG-RAN, as indicated as "alt [a]" and "alt [b]" in FIG. 6.

Alternative a (Shown as "Alt [a]" in FIG. 6)

Step 2a: 5GC sends the DPI results to gNB-CU-CP via NGAP message, where the DPI results include any one or more of the following items:

service type one or more QoS requirements of the corresponding service type bandwidth of the traffic flow encoding protocol frame related information Step 3a: When the gNB-CU-CP receives the NGAP message (at Step 2a), the gNB-CU-CP sends the traffic awareness information to gNB-DU via F1AP message, which includes any one or more of the following items:

PDU session ID

Slice ID

DPI results where the DPI results at least include any one or more of the following items:

service type one or more QoS requirements of the corresponding service type bandwidth of the traffic flow encoding protocol frame related information Alternative b (Shown as "Alt [b]" in FIG. 6)

Step 2b: 5GC sends the DPI results to gNB-CU-CP via NG-U data frame, where the results include any one or more of the following items:

service type one or more QoS requirements of the corresponding service type bandwidth of the traffic flow encoding protocol frame related information Step 3b: gNB-CU-CP sends the traffic awareness information to gNB-DU via NR user plane data frame, which includes any one or more of the following items:

PDU session ID

Slice ID

DPI results where the DPI results at least include any one or more of the following items:

service type one or more QoS requirements of the corresponding service type bandwidth of the traffic flow encoding protocol frame related information Step 4: gNB-DU receives the traffic awareness information and uses the information for scheduling optimization. For example, based on the DPi results, gNB-DU can increase or reduce the resources/bandwidth allocated to some services.

Embodiment 7: Trigger RAN Traffic Awareness with DPI

Figure 7:
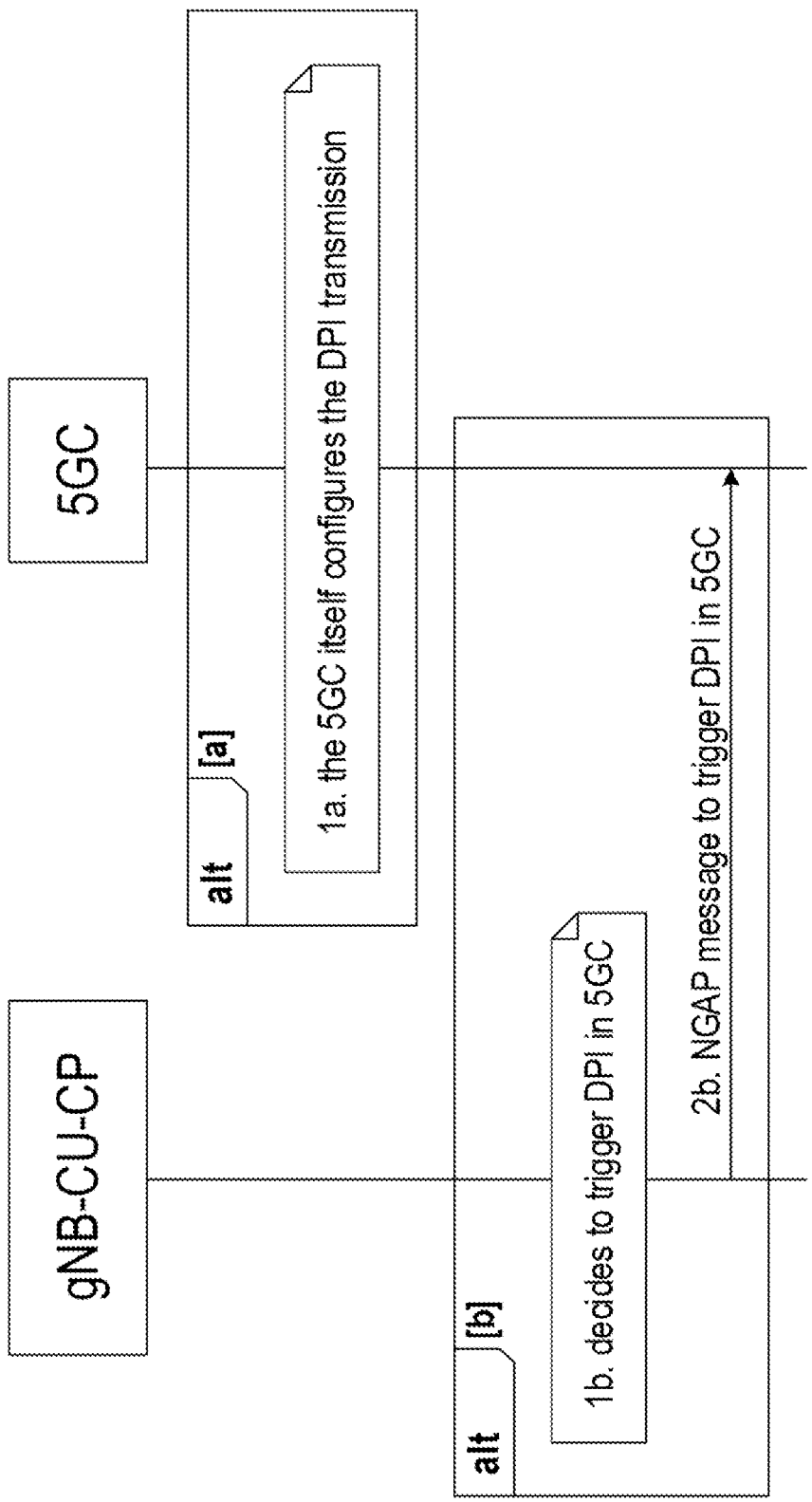
FIG. 7 is an example flowchart for trigger RAN traffic awareness transmission with DPI.

FIG. 7 is an example flowchart for trigger RAN traffic awareness transmission with DPI. The step numbers described below relate to the numbers indicated in the flowchart in FIG. 7.

There are two alternatives for the trigger of DPI assisted RAN traffic awareness, where alternative [a] (shown as "alt [a]" in FIG. 7) is 5GC to trigger, and alternative 2 (shown as "alt [b]" in FIG. 7) is gNB-CU-CP to trigger.

Alternative a

Step 1a: The 5GC configures the DPI itself and triggers the DPI based on the configuration, e.g. at some time period or upon some event.

Alternative b

Step 1b: gNB-CU-CP decides to trigger DPI in 5GC, e.g., when it finds the network performance is getting worse, or when the RVQoE results of some services tend to be bad.

Step 2b: gNB-CU-CP sends an NGAP message to 5GC to trigger DPI in 5GC, which at least includes an indication for DPI in 5GC. In some embodiments, Step 2b in FIG. 7 may be performed before Step 1 of FIG. 6 so that the transmitting of the NGAP message by the gNB-CU-CP (as indicated by Step 2B in FIG. 7) triggers the 5GC to perform DPI (as indicated by Step 1 in FIG. 6).

Example Techniques for RAN Traffic Awareness Transmission

This section describes example techniques for a traffic awareness transmission as described in this patent document:

One node in the radio access network sends the traffic awareness information to another node via network interfaces. The traffic awareness information includes any one or more of the following items:
PDU session ID
Slice ID
service information list for one or more service types, where the service information list may include for each item in the list any one or more of the following items:
service type
traffic characteristics associated with the service type
one or more QoS flow ID(s) associated with a same service type, and/or
service priority associated with the service type
service information list for one or more QoS flows, where the service information list may include for each item in the list any one or more of the following items:
QoS flow ID of a QoS flow
service type associated with the QoS flow identified by the QoS flow ID
traffic characteristics associated with the QoS flow identified by the QoS flow ID, and/or
service priority associated with the QoS flow identified by the QoS flow ID The traffic characteristics may include traffic pattern information, including but not limited to any one or more of the following: periodicity, burst size, data block interval, data block duration, maximum packet size, maximum flow bitrate, average throughput, etc.

As described in Embodiments 1 and/or 2, the gNB-CU-UP sends the traffic awareness information to gNB-CU-CP via E1AP message (e.g., Bearer Context Modification Required).

As described in Embodiment 2, gNB-CU-CP transfers traffic awareness information to the gNB-DU via F1AP message (e.g. UE Context Modification Request).

As described in Embodiment 2, gNB-CU-UP sends the traffic awareness information to gNB-DU via NR user plane data frame.

As described in Embodiment 3, gNB-CU-CP sends the traffic awareness information optionally along with some other information via NGAP message to 5GC, which includes any one or more of the following information:
traffic awareness information
flow(s) to DRB remapping information (optional) (e.g., the flow(s) may include at least some QoS flow(s) that were mapped to DRB in Step 1 of Embodiment 1)
one or more recommended QoS parameters (optional)
where the traffic awareness information includes any one or more of the following items:
PDU session ID
Slice ID
service information list for one or more service types, where the service information list may include for each item in the list any one or more of the following items:
service type
traffic characteristics associated with the service type
one or more QoS flow ID(s) associated with a same service type, and/or
service priority associated with the service type
service information list for one or more QoS flows, where the service information list may include for each item in the list any one or more of the following items:
QoS flow ID of a QoS flow
service type associated with the QoS flow identified by the QoS flow ID
traffic characteristics associated with the QoS flow identified by the QoS flow ID, and/or
service priority associated with the QoS flow identified by the QoS flow ID As described in Embodiment 4, gNB-CU-UP sends the traffic awareness information to 5GC via PDU session user plane data frame.

As described in Embodiment 5, 5GC sends the RAN traffic awareness transmission configuration to gNB-CU-UP via NG-U data frame or network interfaces, where the configuration includes any one or more of the following items:
an indication for RAN (e.g., gNB-CU-UP) to detect traffic characteristics of one or more QoS flows and service types
start time, which is the time for the gNB-CU-UP to start detecting traffic characteristics of one or more QoS flows
stop time, which is the time for the gNB-CU-UP to stop detecting traffic characteristics of one or more QoS flows
sampling rate, which is used to detect the traffic characteristics of one or more QoS flows, and/or
service list, which contains the one or more services that 5GC wants the RAN to detect OAM device generates the configuration for RAN traffic awareness transmission and sends it to gNB-CU-CP. The configuration includes any one or more of the following items:
an indication for RAN (e.g., gNB-CU-UP) to detect traffic characteristics of one or more QoS flows and service types
start time, which is the time for the gNB-CU-UP to start detecting traffic characteristics of one or more QoS flows
stop time, which is the time for the gNB-CU-UP to stop detecting traffic characteristics of one or more QoS flows
sampling rate, which is used to detect the traffic characteristics of one or more QoS flows
service list, which contains the one or more services that 5GC wants the RAN to detect The gNB-CU-CP itself generates the RAN awareness transmission configuration itself and sends the configuration to gNB-CU-CP in some condition, to request the gNB-CU-UP to start detecting traffic characteristics immediately. The configuration includes any one or more of the following items:
an indication for RAN (e.g., gNB-CU-UP) to detect traffic characteristics of one or more QoS flows and service types
start time, which is the time for the gNB-CU-UP to start detecting traffic characteristics of one or more QoS flows
stop time, which is the time for the gNB-CU-UP to stop detecting traffic characteristics of one or more QoS flows
sampling rate, which is used to detect the traffic characteristics of one or more QoS flows
service list, which contains the one or more services that 5GC wants the RAN to detect As described in Embodiment 6, 5GC sends the DPI results to gNB-CU-CP via NGAP message, where the DPI results include any one or more of the following items:
- service type
- one or more QoS requirements of the corresponding service type
- bandwidth of the traffic flow
- encoding protocol
- frame related information The gNB-CU-CP sends the traffic awareness information to gNB-DU via F1AP message, which includes any one or more of the following items:
- PDU session ID
- Slice ID
- DPI results where the DPI results at least include any one or more of the following items:
- service type
- one or more QoS requirements associated with the service type
- bandwidth of the traffic flow
- encoding protocol
- frame related information As described in Embodiment 7, gNB-CU-CP sends an NGAP message to 5GC to trigger DPI in 5GC, which at least includes an indication for DPI in 5GC.

Figure 8:
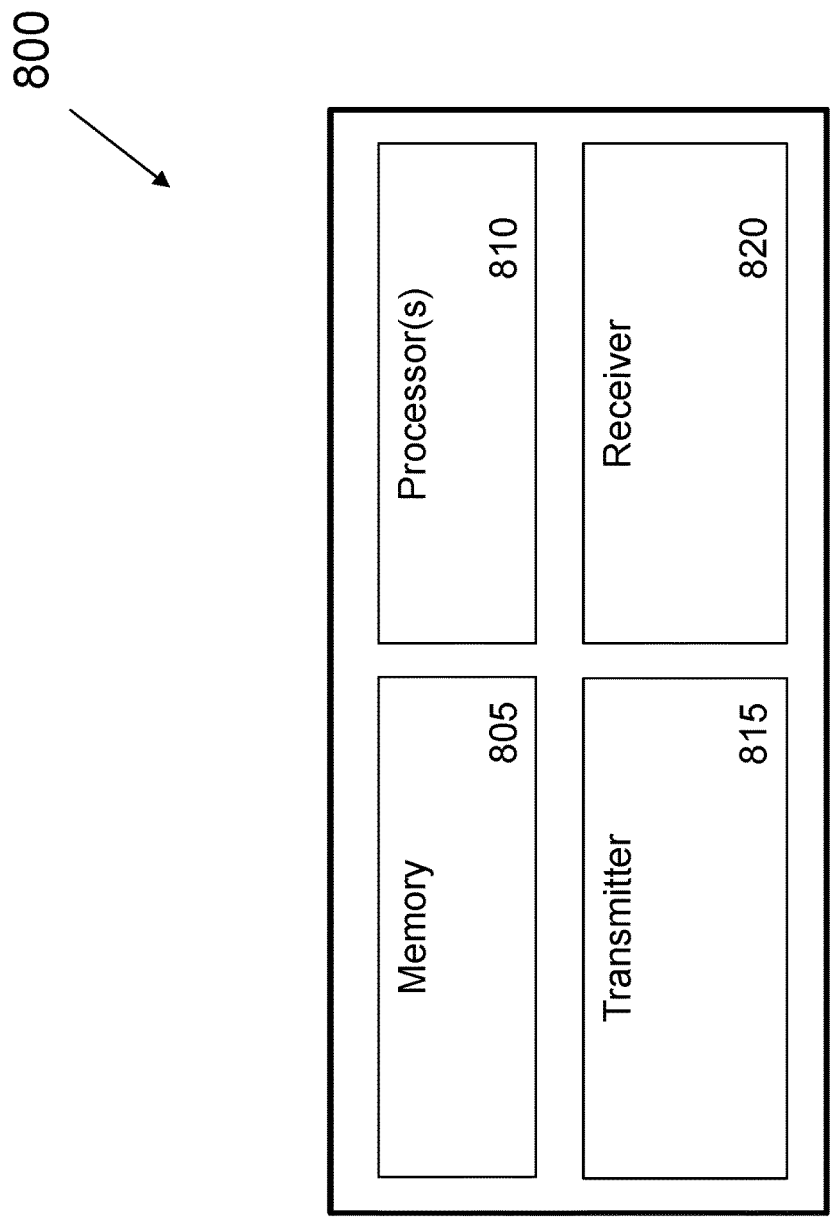
FIG. 8 shows an exemplary block diagram of a hardware platform that may be a part of a network node or a user equipment.

FIG. 8 shows an exemplary block diagram of a hardware platform 800 that may be a part of a network node or a user equipment. The hardware platform 800 includes at least one processor 810 and a memory 805 having instructions stored thereupon. The instructions upon execution by the processor 810 configure the hardware platform 800 to perform the operations described in FIGS. 1 to 7 and 9 to 11 and in the various embodiments described in this patent document. The transmitter 815 transmits or sends information or data to another node. For example, a network node transmitter can send a message to a user equipment. The receiver 820 receives information or data transmitted or sent by another node. For example, a user equipment can receive a message from a network node.

Figure 9:
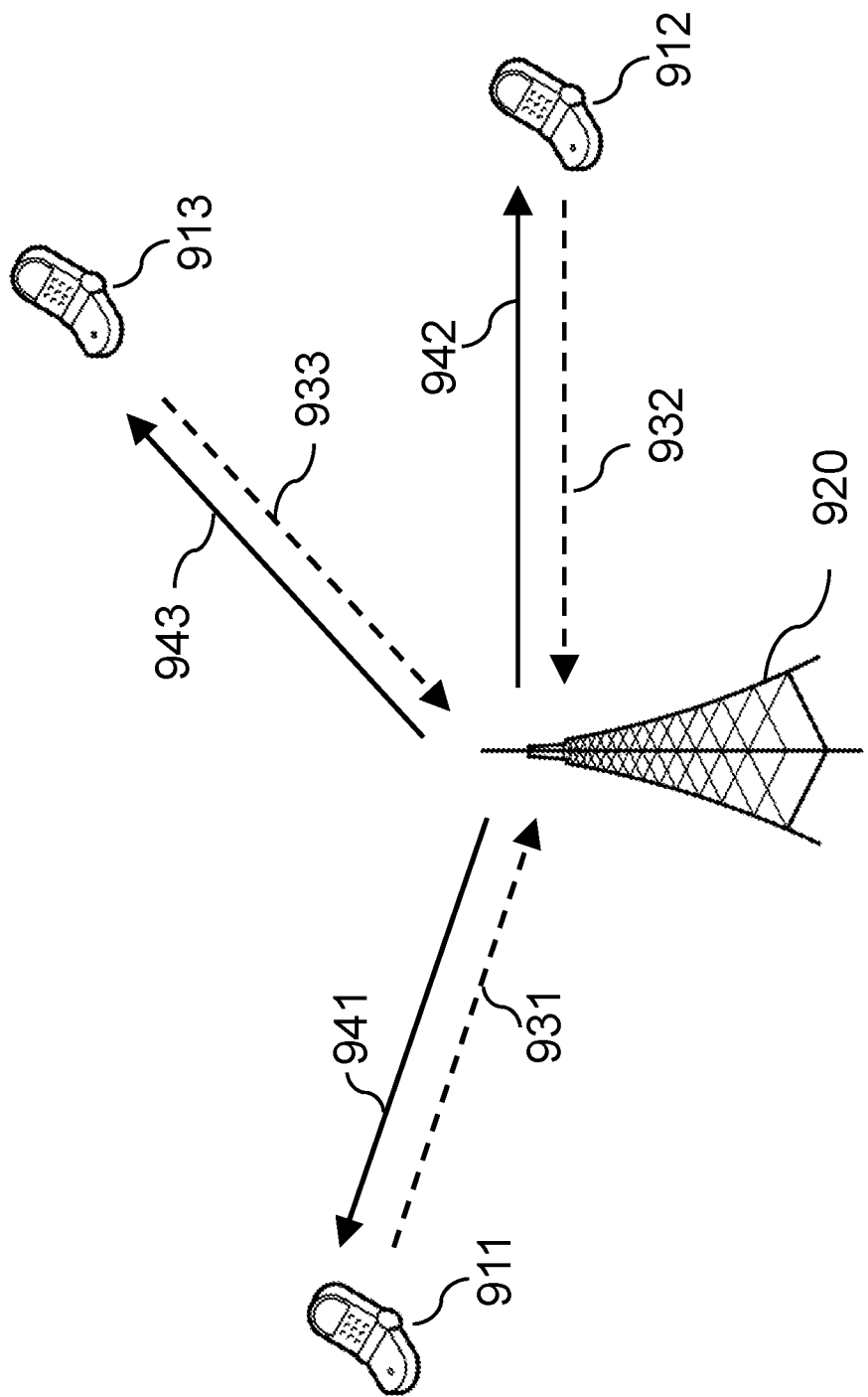
FIG. 9 shows an example of wireless communication including a base station (B S) and user equipment (UE) based on some implementations of the disclosed technology.

The implementations as discussed above will apply to a wireless communication. FIG. 9 shows an example of a wireless communication system (e.g., a 5G or NR cellular network) that includes a base station 920 and one or more user equipment (UE) 911, 912 and 913. In some embodiments, the UEs access the BS (e.g., the network) using a communication link to the network (sometimes called uplink direction, as depicted by dashed arrows 931, 932, 933), which then enables subsequent communication (e.g., shown in the direction from the network to the UEs, sometimes called downlink direction, shown by arrows 941, 942, 943) from the BS to the UEs. In some embodiments, the BS send information to the UEs (sometimes called downlink direction, as depicted by arrows 941, 942, 943), which then enables subsequent communication (e.g., shown in the direction from the UEs to the BS, sometimes called uplink direction, shown by dashed arrows 931, 932, 933) from the UEs to the BS. The UE may be, for example, a smartphone, a tablet, a mobile computer, a machine to machine (M2M) device, an Internet of Things (IoT) device, and so on.

Figure 10:
FIGS. 10 and 11 show exemplary flowcharts for communicating traffic awareness information.

FIG. 10 shows an exemplary flowchart for communicating traffic awareness information. Operation 1002 includes communicating, by a first network function of a network node, traffic awareness information to a second network function of the network node, wherein the traffic awareness information includes traffic characteristics of one or more quality of service (QoS) flows between the network node and a communication node.

In some embodiments, the method further comprises receiving, by the first network function of the network node, a message that indicates that the second network function of the network node received the traffic awareness information. In some embodiments, the traffic awareness information includes any one or more of: a protocol data unit (PDU) session identifier, a slice identifier, a first service information list that includes information about one or more service types, or a second service information list that includes information about the one or more QoS flows. In some embodiments, each item in the first service information list includes any one or more of: a service type, traffic characteristics of the service type, one or more QoS flow identifiers associated with the service type, or a service priority of the service type. In some embodiments, each item in the second service information list includes any one or more of: a QoS flow identifier that identifies a QoS flow, a service type associated with the QoS flow, traffic characteristics associated with the QoS flow, or a service priority associated with the QoS flow.

In some embodiments, the traffic characteristics include traffic pattern information that includes any one or more of the following: a periodicity, a burst size, a data block interval, a data block duration, a maximum packet size, a minimum packet size, a maximum flow bitrate, a minimum flow bitrate, and an average throughput. In some embodiments, the first network function of the network node includes a centralized unit user plane (CU-UP), and wherein the second network function of the network node includes a centralized unit control plane (CU-CP). In some embodiments, the second network function of the network node transmits the traffic awareness information to a third network function of the network node that includes a distributed unit (DU). In some embodiments, the second network function of the network node transmits the traffic awareness information to the DU via a F1AP message. In some embodiments, the second network function of the network node transmits the traffic awareness information to the DU via a user plane data frame. In some embodiments, the second network function of the network node transmits a message to a core network to optimize QoS management, wherein the message comprises any one or more of: the traffic awareness information, at least some of the one or more QoS flows to data radio bearer (DRB) remapping information, or one or more recommended QoS parameters.

In some embodiments, the method further comprises receiving, from the core network, one or more adjusted QoS parameters that are adjusted based on any one or more of the traffic awareness information or the one or more recommended QoS parameters. In some embodiments, the first network function of the network node transmits to a core network a packet data unit (PDU) session user plane data frame that includes the traffic awareness information. In some embodiments, the first network function of the network node receives a traffic awareness transmission configuration from a core network, wherein the traffic awareness transmission configuration includes any one or more of: an indication for the network node to detect traffic characteristics of the one or more QoS flows and service types, a start time when the network node is to begin detecting the traffic characteristics of the one or more QoS flows, a stop time when the network node is to stop detecting the traffic characteristics of the one or more QoS flows, a sampling rate used by the network node to detect the traffic characteristics of the one or more QoS flows, or a service list that indicates one or more services that are indicated to the network node to detect. In some embodiments, the core network includes a 5G core network (5GC).

In some embodiments, the second network function of the network node receives a traffic awareness transmission configuration from an operation, administration and management (OAM) device, wherein the traffic awareness transmission configuration includes any one or more of: an indication for the network node to detect traffic characteristics of the one or more QoS flows and service types, a start time when the network node is to begin detecting the traffic characteristics of the one or more QoS flows, a stop time when the network node is to stop detecting the traffic characteristics of the one or more QoS flows, a sampling rate used by the network node to detect the traffic characteristics of the one or more QoS flows, or a service list that indicates one or more services that are indicated to the network node to detect. In some embodiments, the second network function of the network node sends a traffic awareness transmission configuration to the first network function of the network node to trigger to the network node to detect the traffic characteristics of the one or more QoS flows, wherein the traffic awareness transmission configuration includes any one or more of: an indication for the network node to detect traffic characteristics of the one or more QoS flows and service types, a start time when the network node is to begin detecting the traffic characteristics of the one or more QoS flows, a stop time when the network node is to stop detecting the traffic characteristics of the one or more QoS flows, a sampling rate used by the network node to detect the traffic characteristics of the one or more QoS flows, or a service list that indicates one or more services that are indicated to the network node to detect.

Figure 11:
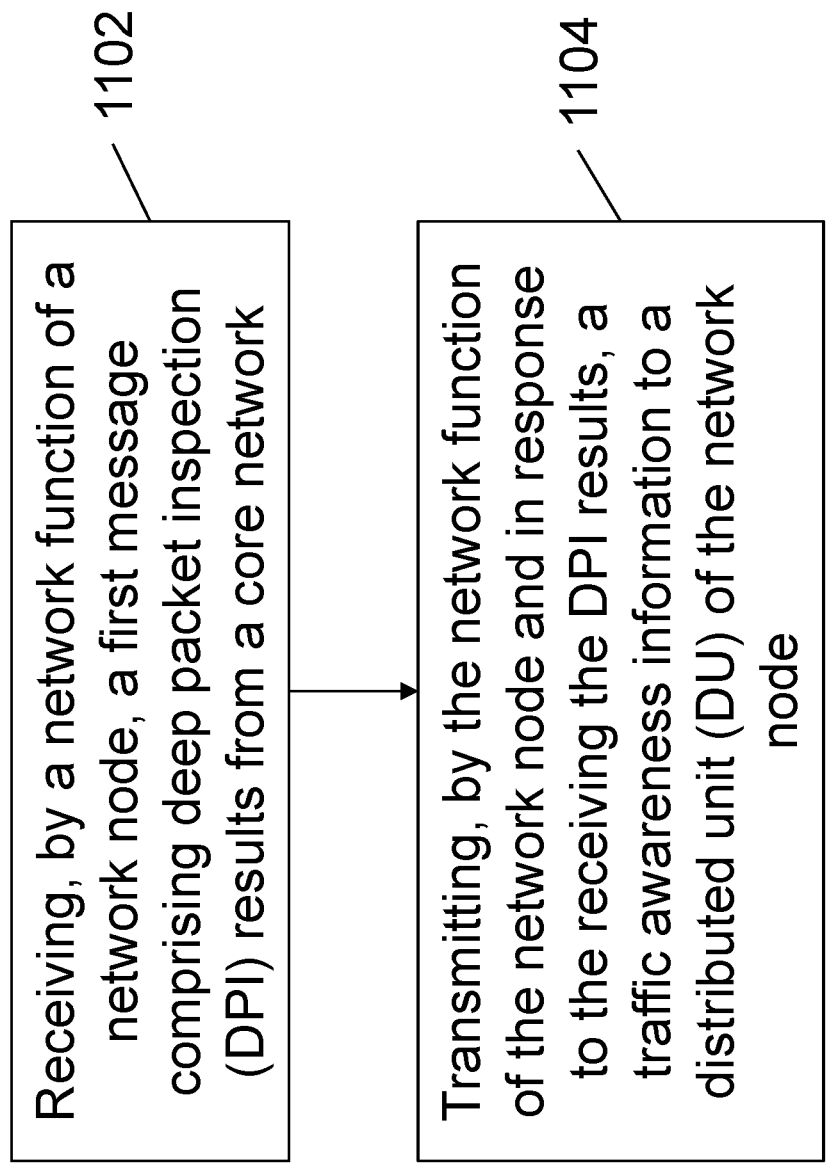

FIG. 11 shows another exemplary flowchart for communicating traffic awareness information. Operation 1102 includes receiving, by a network function of a network node, a first message comprising deep packet inspection (DPI) results from a core network, wherein the DPI results include any one or more of: a service type, one or more quality of flow (QoS) requirements associated with the service type, a bandwidth of traffic flow, an encoding protocol, and a frame related information. Operation 1104 includes transmitting, by the network function of the network node and in response to the receiving the DPI results, a traffic awareness information to a distributed unit (DU) of the network node, wherein the traffic awareness information includes traffic characteristics of one or more quality of service (QoS) flows operated between the network node and a communication node.

In some embodiments, the traffic awareness information comprises any one or more of: a protocol data unit (PDU) session identifier, a slice identifier, or the DPI results. In some embodiments, the network function of the network node sends a second message to the core network to trigger a device in the core network to perform a DPI operation to obtain the DPI results, and the DPI operation is performed before the DPI results are received in the first message. In some embodiments, the network function includes a centralized unit control plane (CU-CP), and the core network includes a 5G core network (5GC).

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
communicating, by a first network function of a network node, traffic awareness information to a second network function of the network node,
wherein the traffic awareness information includes traffic characteristics of one or more quality of service (QoS) flows between the network node and a communication node; and
receiving, by the first network function of the network node, a message that indicates that the second network function of the network node received the traffic awareness information.

2. The method of claim 1, wherein the traffic awareness information includes any one or more of:
a first service information list that includes information about one or more service types, or
a second service information list that includes information about the one or more QoS flows.

3. The method of claim 2,
wherein each item in the first service information list includes any one or more of:
a service type,
traffic characteristics of the service type,
one or more QoS flow identifiers associated with the service type, or
a service priority of the service type,
wherein each item in the second service information list includes any one or more of:
a QoS flow identifier that identifies a QoS flow,
a service type associated with the QoS flow,
traffic characteristics associated with the QoS flow, or
a service priority associated with the QoS flow, and
wherein the traffic characteristics include traffic pattern information that includes any one or more of the following: a periodicity, a burst size, a data block interval, a data block duration, a maximum packet size, a minimum packet size, a maximum flow bitrate, a minimum flow bitrate, and an average throughput.

4. The method of claim 1,
wherein the first network function of the network node includes a centralized unit user plane (CU-UP), and
wherein the second network function of the network node includes a centralized unit control plane (CU-CP), and
wherein the second network function of the network node transmits the traffic awareness information to a third network function of the network node that includes a distributed unit (DU).

5. The method of claim 1, wherein the second network function of the network node transmits a message to a core network to optimize QoS management,
wherein the message comprises any one or more of:
the traffic awareness information,
at least some of the one or more QoS flows to data radio bearer (DRB) remapping information, or
one or more recommended QoS parameters.

6. The method of claim 5, further comprising:
receiving, from the core network, one or more adjusted QoS parameters that are adjusted based on any one or more of the traffic awareness information or the one or more recommended QoS parameters.

7. The method of claim 1, wherein the first network function of the network node transmits to a core network a packet data unit (PDU) session user plane data frame that includes the traffic awareness information.

8. The method of claim 1,
wherein the first network function of the network node receives a traffic awareness transmission configuration from a core network,
wherein the traffic awareness transmission configuration includes any one or more of:
an indication for the network node to detect traffic characteristics of the one or more QoS flows and service types,
a start time when the network node is to begin detecting the traffic characteristics of the one or more QoS flows,
a stop time when the network node is to stop detecting the traffic characteristics of the one or more QoS flows,
a sampling rate used by the network node to detect the traffic characteristics of the one or more QoS flows, or
a service list that indicates one or more services that are indicated to the network node to detect.

9. A wireless communication method, comprising:
receiving, by a network function of a network node, a first message comprising deep packet inspection (DPI) results from a core network,
wherein the DPI results include any one or more of:
a service type,
one or more quality of flow (QoS) requirements associated with the service type,
a bandwidth of traffic flow,
an encoding protocol, and
a frame related information; and
transmitting, by the network function of the network node and in response to the receiving the DPI results, a traffic awareness information to a distributed unit (DU) of the network node,
wherein the traffic awareness information includes traffic characteristics of one or more quality of service (QoS) flows operated between the network node and a communication node.

10. An apparatus for wireless communication comprising a processor configured to implement a method, the processor configured to:
communicate, by a first network function of a network node, traffic awareness information to a second network function of the network node,
wherein the traffic awareness information includes traffic characteristics of one or more quality of service (QoS) flows between the network node and a communication node; and
receive, by the first network function of the network node, a message that indicates that the second network function of the network node received the traffic awareness information.

11. The apparatus of claim 10, wherein the traffic awareness information includes any one or more of:
a first service information list that includes information about one or more service types, or
a second service information list that includes information about the one or more QoS flows.

12. The apparatus of claim 11,
wherein each item in the first service information list includes any one or more of:
a service type,
traffic characteristics of the service type,
one or more QoS flow identifiers associated with the service type, or
a service priority of the service type, wherein each item in the second service information list includes any one or more of:
  a QoS flow identifier that identifies a QoS flow,
  a service type associated with the QoS flow,
  traffic characteristics associated with the QoS flow, or
  a service priority associated with the QoS flow, and
wherein the traffic characteristics include traffic pattern information that includes any one or more of the following: a periodicity, a burst size, a data block interval, a data block duration, a maximum packet size, a minimum packet size, a maximum flow bitrate, a minimum flow bitrate, and an average throughput.

13. The apparatus of claim 10,
wherein the first network function of the network node includes a centralized unit user plane (CU-UP), and wherein the second network function of the network node includes a centralized unit control plane (CU-CP), and
wherein the second network function of the network node transmits the traffic awareness information to a third network function of the network node that includes a distributed unit (DU).

14. The apparatus of claim 10, wherein the second network function of the network node is configured to transmit a message to a core network to optimize QoS management,
wherein the message comprises any one or more of:
  the traffic awareness information,
  at least some of the one or more QoS flows to data radio bearer (DRB) remapping information, or
  one or more recommended QoS parameters.

15. The apparatus of claim 14, wherein the processor is further configured to:
  receive, from the core network, one or more adjusted QoS parameters that are adjusted based on any one or more of the traffic awareness information or the one or more recommended QoS parameters.

16. The apparatus of claim 10, wherein the first network function of the network node transmits to a core network a packet data unit (PDU) session user plane data frame that includes the traffic awareness information.

17. The apparatus of claim 10,
wherein the first network function of the network node is configured to receive a traffic awareness transmission configuration from a core network,
wherein the traffic awareness transmission configuration includes any one or more of:
  an indication for the network node to detect traffic characteristics of the one or more QoS flows and service types,
  a start time when the network node is to begin detecting the traffic characteristics of the one or more QoS flows,
  a stop time when the network node is to stop detecting the traffic characteristics of the one or more QoS flows,
  a sampling rate used by the network node to detect the traffic characteristics of the one or more QoS flows, or
  a service list that indicates one or more services that are indicated to the network node to detect.

18. An apparatus for wireless communication comprising a processor configured to implement a method, the processor configured to:
  receive, by a network function of a network node, a first message comprising deep packet inspection (DPI) results from a core network,
  wherein the DPI results include any one or more of:
    a service type,
    one or more quality of flow (QoS) requirements associated with the service type,
    a bandwidth of traffic flow,
    an encoding protocol, and
    a frame related information; and
  transmit, by the network function of the network node and in response to the receiving the DPI results, a traffic awareness information to a distributed unit (DU) of the network node,
    wherein the traffic awareness information includes traffic characteristics of one or more quality of service (QoS) flows operated between the network node and a communication node.

* * * * *